United States Patent
Li et al.

(10) Patent No.: US 12,336,041 B2
(45) Date of Patent: Jun. 17, 2025

(54) SIDELINK DISCONTINUOUS RECEPTION(SL DRX) FOR QUALITY OF SERVICE (QOS) AND POWER SAVING

(71) Applicant: QUALCOMM Incorporated, San Diego, CA (US)

(72) Inventors: Qing Li, Princeton Junction, NJ (US); Hong Cheng, Basking Ridge, NJ (US); Ozcan Ozturk, San Diego, CA (US); Kapil Gulati, Belle Mead, NJ (US); Dan Vassilovski, Del Mar, CA (US); Gavin Bernard Horn, La Jolla, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/446,034

(22) Filed: Aug. 26, 2021

(65) Prior Publication Data
US 2022/0070965 A1  Mar. 3, 2022

Related U.S. Application Data

(60) Provisional application No. 63/072,577, filed on Aug. 31, 2020.

(51) Int. Cl.
*H04W 76/28* (2018.01)
*H04W 28/24* (2009.01)
(Continued)

(52) U.S. Cl.
CPC .......... *H04W 76/28* (2018.02); *H04W 28/24* (2013.01); *H04W 52/0232* (2013.01); *H04W 92/18* (2013.01)

(58) Field of Classification Search
CPC ... H04W 72/40; H04W 72/12; H04W 72/121; H04W 72/30; H04W 76/28; H04W 76/14;
(Continued)

(56) References Cited

U.S. PATENT DOCUMENTS

2021/0227620 A1* 7/2021 Pan .................. H04W 76/28
2022/0030661 A1* 1/2022 Jeong ................ H04W 72/20
(Continued)

OTHER PUBLICATIONS

LG Electronics: "New WID on NR Sidelink Enhancement," 3GPP TSG RAN Meeting #86, RP-193231 (revision of RP-193134), Sitges, Spain, Dec. 9-12, 2019, 6 Pages.
(Continued)

*Primary Examiner* — Robert C Scheibel
(74) *Attorney, Agent, or Firm* — Patterson + Sheridan, L.L.P

(57) ABSTRACT

Certain aspects provide a method for wireless communication by a user-equipment (UE). The method generally includes receiving one or more configurations for sidelink discontinuous reception (SL DRX); determining an SL DRX pattern for a communication on the sidelink, based on the one or more configurations for DRX, the communication comprising a service for broadcast communication, a group of UEs for groupcast communication, or a UE pair for unicast communication; and communicating with one or more other UEs on the sidelink using the determined SL DRX pattern.

29 Claims, 16 Drawing Sheets

(51) Int. Cl.
*H04W 52/02* (2009.01)
*H04W 92/18* (2009.01)

(58) Field of Classification Search
CPC . H04W 76/20; H04W 28/24; H04W 52/0232; H04W 92/18; Y02D 30/70
See application file for complete search history.

(56) References Cited

U.S. PATENT DOCUMENTS

| | | | |
|---|---|---|---|
| 2022/0046648 A1* | 2/2022 | Kiilerich Pratas | H04W 72/02 |
| 2022/0353815 A1* | 11/2022 | Lin | H04W 52/0232 |
| 2022/0361284 A1* | 11/2022 | Liu | H04W 8/00 |
| 2022/0369417 A1* | 11/2022 | Park | H04W 28/0268 |
| 2022/0418036 A1* | 12/2022 | Back | H04W 76/28 |
| 2023/0014079 A1* | 1/2023 | Vos | H04W 76/28 |
| 2023/0014303 A1* | 1/2023 | Di Girolamo | H04W 72/20 |
| 2023/0063472 A1* | 3/2023 | Freda | H04W 76/28 |
| 2023/0082194 A1* | 3/2023 | Liu | H04W 76/28 |
| 2023/0171843 A1* | 6/2023 | Luo | H04W 68/005 370/310 |

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.5.0, Jun. 2021, XP052030240, pp. 1-156, [Retrieved on Jul. 7, 2021], Section. 6.1.3.25, p. 130-p. 131, Figures 6.1.3.25-1.

* cited by examiner

```
-- ASN1START
-- TAG-SL-DRX-CONFIG-START
SL-DRX-Config ::=           SEQUENCE {
    sl-drx-Offset-min       CHOICE {
        ms10                INTEGER(0..9),
        ms20                INTEGER(0..19),
        ms32                INTEGER(0..31),
        ms40                INTEGER(0..39) ...} OPTIONAL,
    sl-drx-Offset-seed      INTEGER (0..1023), OPTIONAL,
    sl-drx-Offset-i         INTEGER (0..1023), OPTIONAL,
    sl-drx-Offset-M         INTEGER (0..511), OPTIONAL,
    sl-drx-CycleLength-min  ENUMERATED {
        ms2, ms3, ms4, ms5, ms6, ms7, ms8, ms10, ms14, ms16, ms20, ms30, ms32, ms35, ms40, ms64, ms80, ms128, ms160, ms256, ms320, ...} OPTIONAL,
    sl-drx-onDurationTimer  CHOICE {
        subMilliSeconds     INTEGER (1..31),
        milliSeconds        ENUMERATED {
            ms1, ms2, ms3, ms4, ms5, ms6, ms8, ms10, ms20, ms30, ms40, ms50, ms60, ms80, ms100, ms200, ms300, ms400, ms500, ...} OPTIONAL,
    sl-drx-InactivityTimer  ENUMERATED {
        ms0, ms1, ms2, ms3, ms4, ms5, ms6, ms8, ms10, ms20, ms30, ms40, ms50, ms60, ms80, ms100, ms200, ms300, ms500, ms750, ...} OPTIONAL,
    sl-drx-RetransmissionTimer ENUMERATED {
        sl0, sl1, sl2, sl4, sl6, sl8, sl16, sl24, sl33, sl40, sl64, sl80, sl96, sl112, sl128, sl160, ...} OPTIONAL,
    sl-drx-HARQ-RTT-Timer   INTEGER (0..56), OPTIONAL
}
-- TAG-SL-DRX-CONFIG-STOP
-- ASN1STOP
```

FIG. 9

```
-- ASN1START
-- TAG-SSL-DRX-CONFIG-START
SSL-DRX-Config ::=        SEQUENCE {
    sl-drx-Offset         CHOICE {
        ms10              INTEGER(0..9),
        ms20              INTEGER(0..19),
        ms32              INTEGER(0..31),
        ms40              INTEGER(0..39),...  } OPTIONAL,
    sl-drx-CycleLength    ENUMERATED {
                          ms2, ms3, ms4, ms5, ms6, ms7, ms8, ms10, ms14, ms16, ms20, ms30, ms32, ms35, ms40, ms64, ms80, ms128, ms160, ms256, ms320,...} OPTIONAL,
    sl-drx-onSkip         INTEGER (0..1023) OPTIONAL,        Note: mapping of SL DRX On skipping
    sl-drx-onDurationTimer CHOICE {
                          subMilliSeconds INTEGER (1..31),
                          milliSeconds ENUMERATED {
                          ms1, ms2, ms3, ms4, ms5, ms6, ms8, ms10, ms20, ms30, ms40, ms50, ms60, ms80, ms100, ms200, ms300, ms400, ms500, ms600,...} OPTIONAL,
    sl-drx-onOffset       ENUMERATED { ms1, ms2, ms3, ms4, ms5, ms6, ms7, ms8, ms10,...} OPTIONAL,
    sl-drx-onLength       ENUMERATED { ms1, ms2, ms3, ms4, ms5, ms6, ms7, ms8, ms10,...} OPTIONAL,
    sl-drx-onMin          ENUMERATED { ms1, ms2, ms3, ms4, ms5, ms6, ms7,...} OPTIONAL,
    sl-drx-InactivityTimer ENUMERATED {
                          ms0, ms1, ms2, ms3, ms4, ms5, ms6, ms8, ms10, ms20, ms30, ms40, ms50, ms60, ms80, ms100, ms200, ms300,...} OPTIONAL,
    sl-drx-RetransmissionTimer ENUMERATED {sl0, sl1, sl2, sl4, sl6, sl8, sl16, sl24, sl33, sl40, sl64, sl80, sl96, sl112, sl128, sl160,...} OPTIONAL,
    sl-drx-HARQ-RTT-Timer INTEGER (0..56) OPTIONAL,
}
-- TAG-SSL-DRX-CONFIG-STOP
-- ASN1STOP
```

FIG. 15

SIDELINK DISCONTINUOUS RECEPTION(SL DRX) FOR QUALITY OF SERVICE (QOS) AND POWER SAVING

CROSS-REFERENCE TO RELATED APPLICATION

This application claims benefit of and priority to U.S. Provisional Application No. 63/072,577 filed Aug. 31, 2020, which is hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method for wireless communication by a user-equipment (UE). The method generally includes receiving one or more configurations for sidelink discontinuous reception (DRX); determining a sidelink DRX pattern associated with a communication based on the one or more configurations for sidelink DRX, the communication comprising a communication among UEs using a service via broadcast, a communication among UEs of a group via groupcast, or a communication between a UE pair via unicast; and communicating with one or more other UEs on sidelink using the determined DRX pattern.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 illustrates example SL DRX configuration parameters, in accordance with certain aspects of the present disclosure.

FIG. 15 illustrates example scalable SL DRX configuration parameters, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
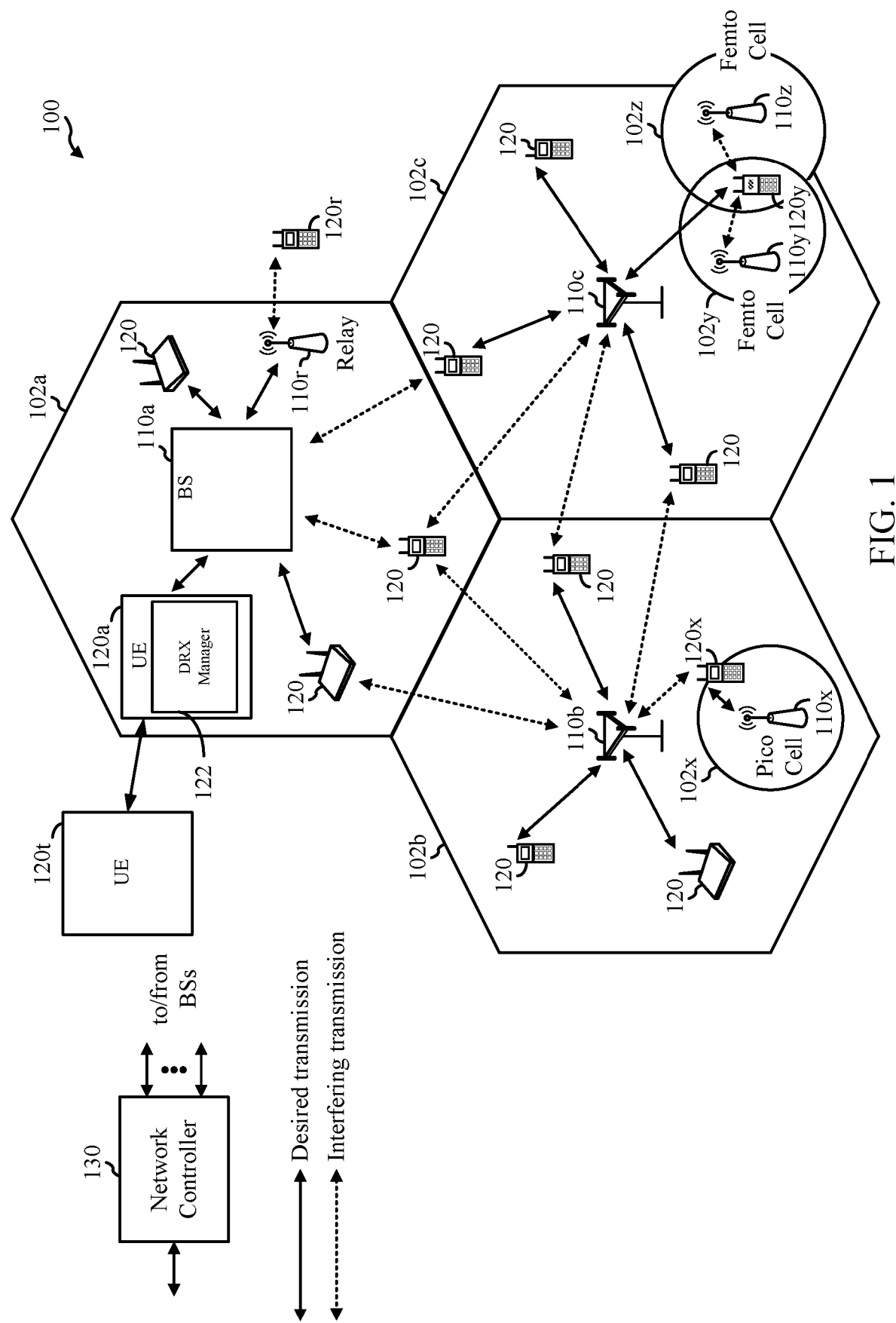
FIG. 1 is a block diagram conceptually illustrating an example telecommunications system, in accordance with certain aspects of the present disclosure.

Aspects of the present disclosure provide apparatus, methods, processing systems, and computer-readable mediums for sidelink discontinuous reception (SL DRX) for sidelink communication. For example, various user-equipments (UEs) may be in one or multiple sidelink communications, using broadcast, groupcast, or unicast type communication, which may require different SL DRX patterns for different power saving and quality of service (QoS) requirements. Since UEs may only communicate with each other on sidelink during SL DRX on phase (e.g., awake phase), SL DRX also defines traffic patterns on sidelink. Certain aspects provide techniques for configuring an SL DRX pattern for UEs in sidelink communications in an attempt to reduce interference and increase media utilization, while facilitating different quality of service (QoS), traffic pattern, and power saving requirements of the UEs. For instance, UEs may select SL DRX patterns in accordance with a service, group, or UE pair such that overlapping among different SL DRX on phases that may interfere with one another is reduced. Certain aspects also provide for scalability of SL DRX patterns, allowing UEs to facilitate different requirements of different messages, such as latency, by dynamically adjusting SL DRX patterns to meeting specific communication demands.

The following description provides examples of configurations for sidelink (SL) communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the UEs 120 may be configured for managing sidelink in a discontinuous reception (DRX) mode of operations. As shown in FIG. 1, the UE 120*a* includes a DRX manager 122. The DRX manager 122 may be configured to receive one or more configurations for sidelink discontinuous reception (DRX); determine a sidelink DRX pattern based on the one or more configurations for sidelink DRX, the communication comprising a communication among UEs using a service via broadcast, a communication among UEs of a group via groupcast, or a communication between a UE pair via unicast; and communicate with one or more other UEs on a sidelink channel using the determined sidelink DRX pattern.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
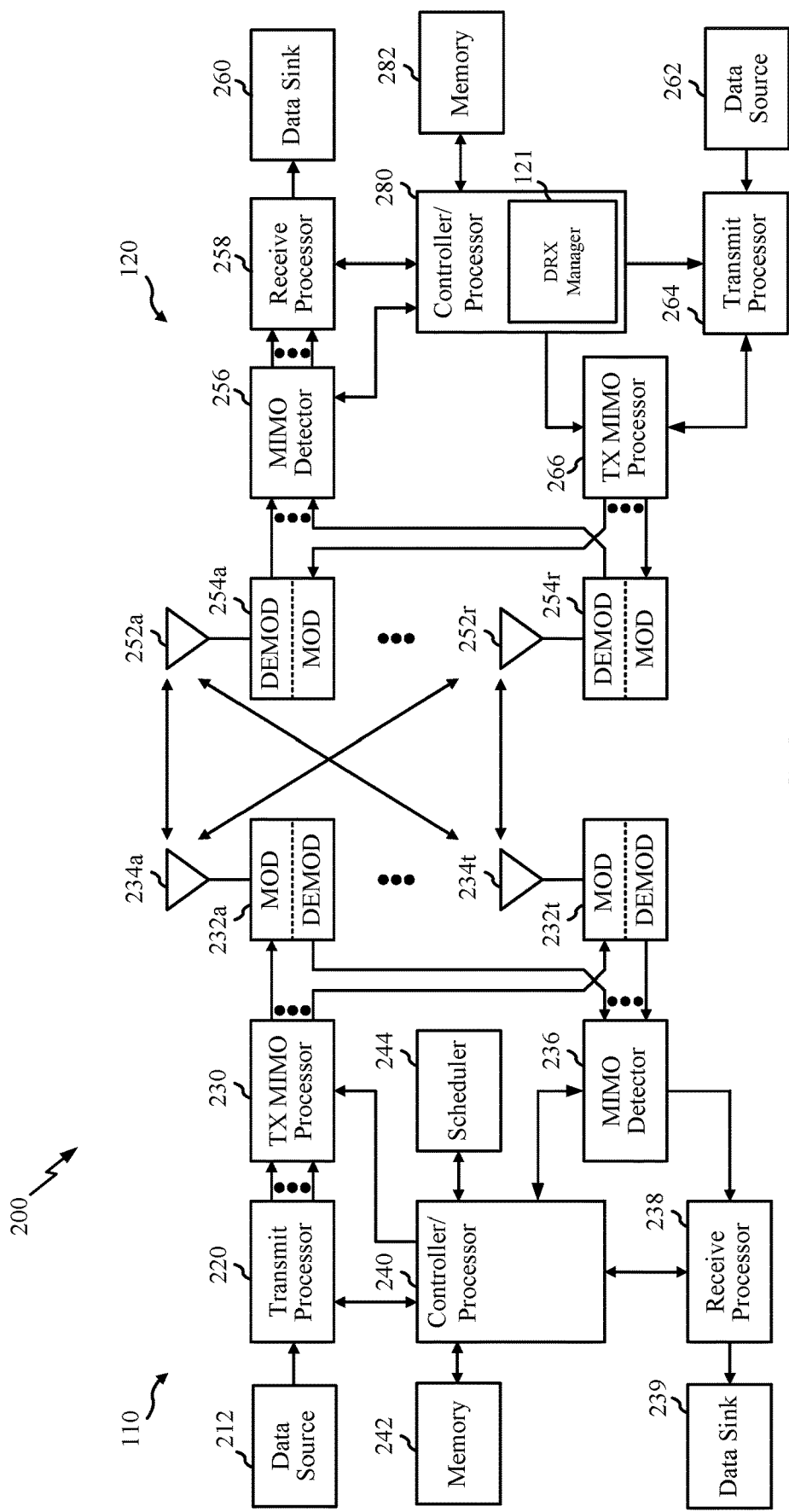
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, cyclic prefix (CP)-OFDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the DRX manager 122. Although shown at the Controller/Processor, other components of the UE 120a may be used performing the operations described herein.

Figure 3B:
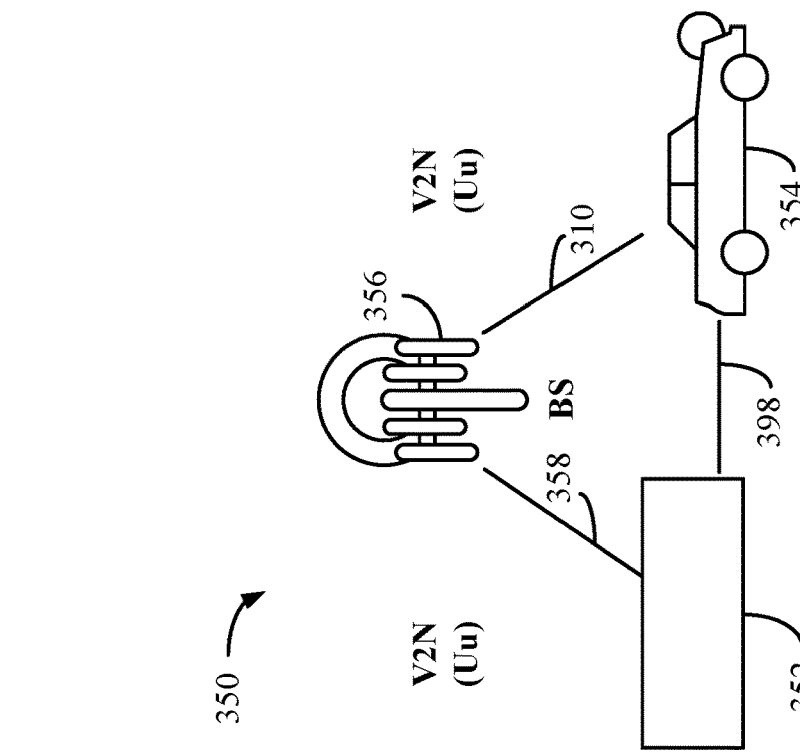
FIGS. 3A and 3B show diagrammatic representations of example vehicle to everything (V2X) systems in accordance with some aspects of the present disclosure.
Figure 3A:
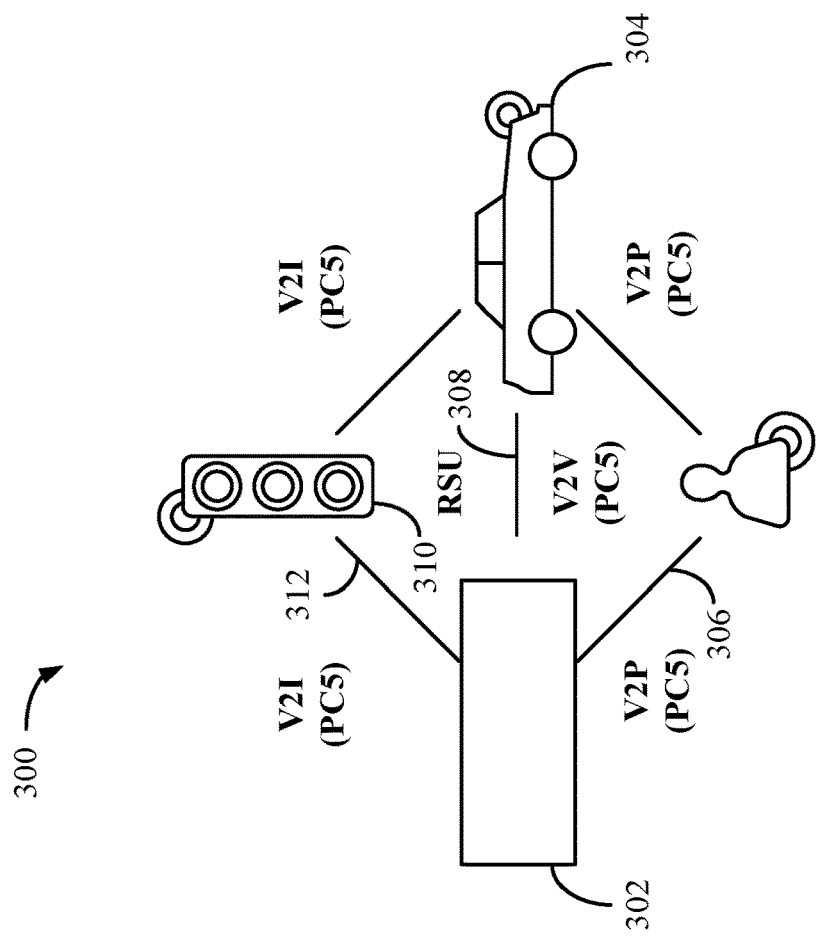

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398 over a PC5 interface.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, a roadside unit (RSU) 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink control channel (PSCCH), a physical sidelink shared channel (PSSCH), and a physical sidelink feedback channel (PSFCH). The PSSCH may carry discovery expressions that enable proximal devices to discover each other. The PSCCH may carry control signaling such as sidelink resource configurations and other parameters used for data transmissions, and the PSSCH may carry the data transmissions. The PSSCH may carry feedback such as channel state information (CSI) related to a sidelink channel quality.

Discontinuous Reception (DRX) on Sidelink

In a discontinuous reception (DRX) mode of operation, a UE may go into a low power ("sleep") mode (also referred to herein as a "sleep phase"), which may also be referred to as a low power state, for a certain period of time (referred to as a DRX OFF phase, or duration) and wakes up again during a DRX on (e.g., awake phase) duration (also referred to as a DRX on phase) to check if there is any data to be received. The cycle of sleep and wake-up (DRX on and DRX off) durations repeats over time, allowing the UE to save power while maintaining communication.

Currently, DRX is not defined for sidelink operations, and thus, a receiver (Rx) UE has to monitor for sidelink control information (SCI) for each time slot, causing high power consumption which is especially detrimental for battery power confined UEs such as pedestrian UEs for Vehicle-to-Person (V2P) service on sidelink or UEs for public safety services on sidelink. Thus, SL DRX design is needed to save power for sidelink communications. As compared with communications between a UE and a base station (B S) on the Uu interface, sidelink communications among different UEs are more diverse. For example, a UE may simultaneously engage in different vehicle-to-everything (V2X) services with different quality of service (QoS) requirements (e.g., reliability, latency, etc.), and different communication types (e.g., broadcast, groupcast and unicast). Therefore, a one-size-fits-all SL DRX design may not be best for both saving power and meeting diverse QoS requirements.

Figure 4:
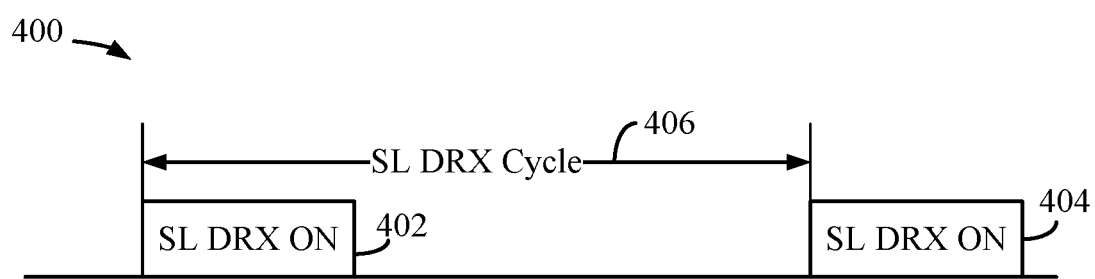
FIG. 4 illustrates an example sidelink discontinuous reception (SL DRX) configuration of a UE, in some aspects.

FIG. 4 illustrates an example SL DRX configuration 400 of a UE. As illustrated, the SL DRX configuration 400 may include SL DRX on phases 402, 404. As described herein, an SL DRX on phase repeats every DRX cycle. For example, the DRX on phase 402 is during a DRX cycle 406, as illustrated. A transmitter (Tx) UE is awake during the DRX on phases 402, 404 to communicate with other Rx UE for unicast or Rx UEs for broadcast and groupcast, (e.g., Rx UE(s) monitors for signaling that may be received from the Tx UE), and both Tx UE and Rx UE(s) are in a low power state (e.g., sleep phase) at other times (also referred to as SL DRX sleep phase). In addition, a UE of a service, a group, or a UE pair, becomes a Tx UE on sidelink when it has a packet to transmit on sidelink to the other UEs of a service or a group or to the other UE of a UE pair. Hence, differently from the DRX for a UE monitoring downlink control information (DCI) from a base station at Uu interface, SL DRX is bidirectional on sidelink for both Tx UE and Rx UE(s) and therefore an SL DRX forms sidelink traffic patterns for a service, a group or a UE pair.

Certain aspects provide an SL DRX design to facilitate power saving and various QoS requirements of UEs in sidelink communications. For instance, certain aspects provide techniques to form SL DRX on phases for UEs that are in communication with one another, while avoiding the SL DRX on phases overlapping with the SL DRX on phases for other UEs that are not in the same communication to reduce interference and sidelink congestion. In other words, an SL DRX is formed for UEs using a service, for UEs of a group, or for UEs of a UE pair.

Since SL DRX forms sidelink traffic patterns, certain aspects provide techniques for distributing SL DRX on patterns for different services, groups, or UE pairs to avoid uneven traffic on sidelink.

Certain aspects also provide techniques for further improving sidelink DRX cycle and sidelink DRX on pattern for different QoS and power saving requirements within a service, a group or a UE pair.

Certain aspects define an SL DRX pattern for sidelink and specify the corresponding UE procedure. For example, certain aspects provide a mechanism aiming to align sidelink DRX wake-up time among UEs communicating with each other.

Techniques for Distribution of SL DRX on for Different Services, Groups, or UE Pairs A sidelink discontinuous reception (SL DRX) may be formed to assist a Rx UE for unicast or Rx UEs for broadcast and groupcast in determining when to monitor SCI(s) from a Tx UE indicating a sidelink transmission to the Rx UE(s), and therefore allow the Rx UE(s) to save power by non-contiguously monitoring SCI. An SL DRX is bidirectional and also forms the traffic pattern for a Tx UE. In other words, a Tx UE may not transmit while Rx UE(s) is not in an SL DRX on state for monitoring SCI(s). In other words, if the Rx UE(s) is not in a DRX on phase, the Rx UE may be in a sleep mode of operation and may not monitor for SCIs. Thus, a Tx UE may also forgo transmissions to other UEs that are not in a DRX on phase. Therefore, for different sidelink communications, SL DRX may be configured differently to avoid SL DRX on phase overlapping which may cause more interference and congestion on sidelink.

Certain aspects provide for techniques for alignment of DRX on patterns for UEs in communication, while reducing possible overlap of DRX on phases of UEs that are not in the same communication. By reducing the overlap between UEs that are not in the same communication, interference to sidelink communications between UEs may be reduced. For example, as described in more detail herein, different SL DRX patterns may be implemented for different services, groups, or UE pairs to reduce possible overlapping.

For broadcast type communication, any UE may broadcast to the other UEs and hence is a Tx UE, which may not be aware of the Rx UEs that may receive transmissions from the Tx UE. Thus, an SL DRX pattern may be configured based on a V2X application or service that is being used on sidelink. For example, all UEs that may be using a particular application or service (e.g., a sensor sharing application or service or a public safety application or service) may use the same SL DRX pattern, and UEs using different applications or services may use different SL DRX patterns. In other words, UEs using the same service may use the same SL DRX pattern as those UEs are likely to be transmitting and receiving broadcast signals for that service. Thus, an SL DRX pattern may be configured in accordance with the identifier associated with an application or service. Other UEs that are part of different applications or services may use a different SL DRX pattern associated with a different application or service identifier or index.

For groupcast type communication, an SL DRX may be configured for all UEs within a group. For example, any UE may groupcast to the other UEs within a group and therefore, all UEs of a group may use the same SL DRX pattern, e.g., all UEs of a vehicle platoon or all UEs of a positioning cluster may use an SL DRX pattern. In other words, for groupcast type communication, the UEs that are part of a group are known, and may be associated with an identifier of the group. Thus, the SL DRX pattern may be configured in accordance with the identifier associated with the group of UEs that are communicating using groupcast type communication. Other UEs part of different groupcast communications may use a different SL DRX pattern associated with a different group identifier or index.

For unicast type communication, an SL DRX pattern may be configured for a UE pair link. A UE may be a Tx UE or Rx UE at a time, forming a UE pair link on PC5 interface (e.g., PC5 link) that uses the same DRX pattern to facilitate unicast communication between the pair of UEs. Other UEs that form different unicast links (e. g., PC5 links) may use a different DRX pattern to reduce interference. Thus, the SL DRX pattern may be configured in accordance with the identifier or index associated with a UE pair or a UE link. Other UEs that are part of different UE pair or UE link may use a different SL DRX pattern associated to a different UE pair or UE link identifier.

An SL DRX may be configured for all UEs of a service, a group, or a UE pair, which forms sidelink traffic via SL DRX on duration (e.g., duration of an SL DRX on phase). If SL DRX on phases are not evenly distributed in time, uneven traffic patterns may cause low sidelink resource utilization at sometimes and high interference on sidelink due to sidelink congestion at other times. As a UE may engage in multiple sidelink broadcasts, groupcasts and/or unicasts, overlapped SL DRX on durations may cause the UE to lose a reception depending on UE's capability. Therefore, certain aspects reduce possible SL DRX on phase overlapping among SL DRXs for different services, groups and UE pairs on sidelink, as described herein.

An SL DRX may be formed with the same or different SL DRX cycle lengths and different SL DRX offsets (e.g., for an SL DRX on phase starting point referenced from a system time reference point) for different services, groups or UE pairs to reduce possible overlapping, as described in more detail herein. The SL DRX cycle length may be one or multiple of a SL DRX Cycle Length, e.g., a minimum SL DRX Cycle Length, to avoid irregular overlapping patterns. In some aspects, the SL DRX offset for SL DRX on phase may be randomized in an attempt for different services, groups or UE pairs to have SL DRX on durations at different times. In some aspects, the SL DRX offset for SL DRX on may be distributed based on the ID or index of a service, a group or a UE pair, so that different services, groups or UE pairs may have SL DRX on duration evenly distributed.

Various parameters may be configured for an SL DRX for a service, a group or a UE pair, as described in more detail herein. For example, SL DRX configuration may be preconfigured or configured or reconfigured via a radio resource control information element (RRC IE).

Figure 5:
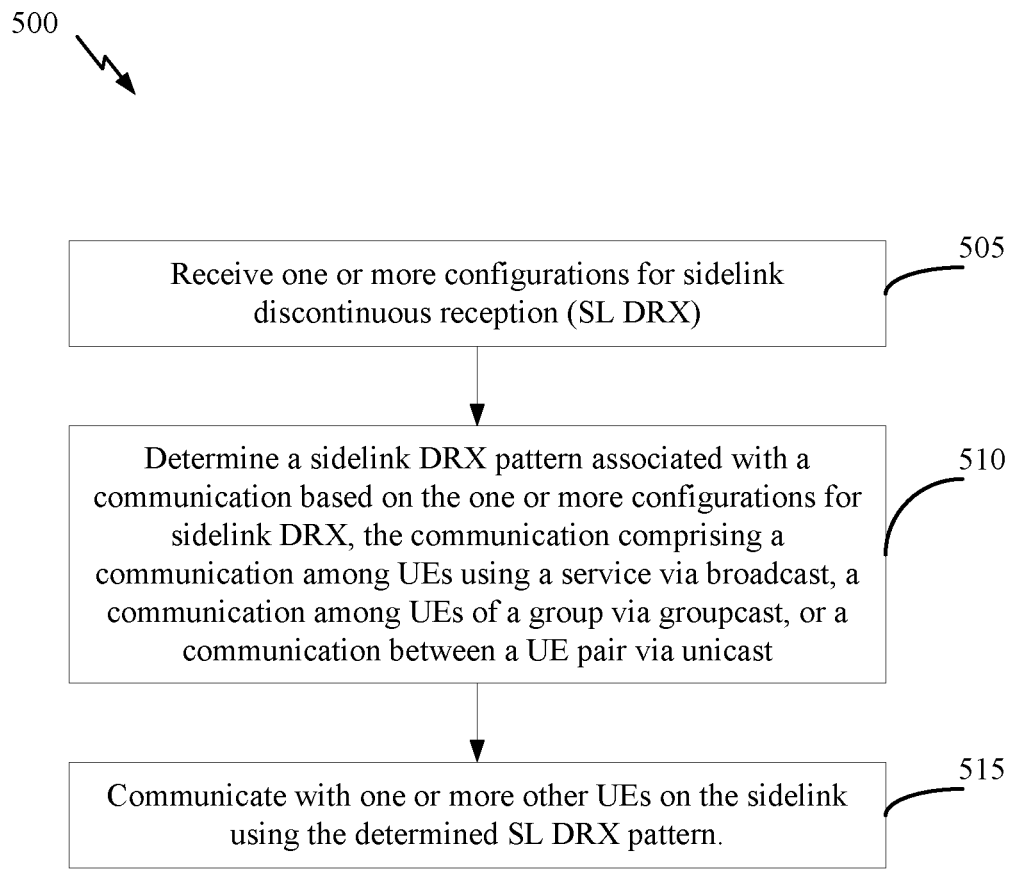
FIG. 5 is a flow diagram illustrating example operations for wireless communication, in accordance with certain aspects of FIG. 6 illustrates SL DRX for different services, groups, or UE pairs, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100, or a UE 120t out of the wireless communication network 100), such as a Tx UE or a Rx UE. A Tx UE generally refers to a UE transmitting during a DRX on phase, and a Rx UE generally refers to a UE receiving during a DRX on phase.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE receiving one or more configurations for SL DRX. At block 510, the UE determines an SL DRX pattern or configuration associated with a sidelink communication based on the one or more configurations for SL DRX. The communication may include a communication among UEs using a service via broadcast, a communication among UEs of a group via groupcast, or a communication between a UE pair via unicast. In some aspects, the DRX pattern (e.g., a SL DRX cycle length) may be determined based on quality of service (QoS) associated with an application or service for broadcast communication, a group of UEs for groupcast communication, or a UE pair for unicast communication. In some aspects, the DRX pattern (e.g., a SL DRX offset from a reference point in time) may be determined based on an identification of the sidelink communication which, for example, may include an identifier or index of an application or service for broadcast communication, a group of UEs for groupcast communication, or a UE pair for unicast communication. At block 515, the Tx UE communicates with one or more other UEs on sidelink using the determined SL DRX pattern.

In certain aspects, determining the SL DRX pattern may include selecting an SL DRX cycle length from different candidate SL DRX cycle lengths configured for different services, groups of UEs, or UE pairs. For example, the different candidate sidelink DRX cycle lengths configured may be associated with different QoS requirements. In other aspects, determining the SL DRX pattern may include determining an SL DRX offset from different SL DRX offsets for different services, groups of UEs, or UE pairs. The DRX offset may indicate a starting point of a DRX on phase offset from a system reference point in time, as described in more detail herein.

Figure 6:
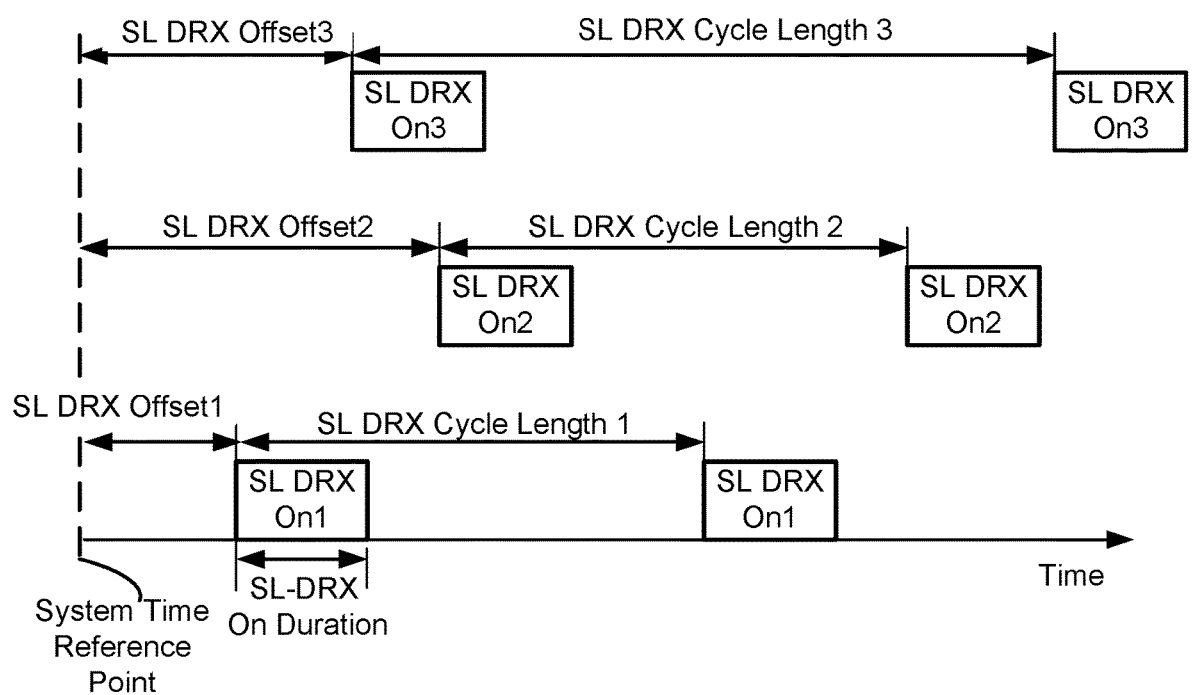

FIG. 6 illustrates SL-DRX for different services, groups, or UE pairs, in accordance with certain aspects of the present disclosure. As described, to avoid uneven traffic on sidelink for better resource utilization and less interference, an SL DRX pattern may be formed with the same or different SL DRX cycle length and different SL DRX offset for SL DRX on phase for a service, a group, or a UE pair on sidelink.

As illustrated, a first SL DRX configuration (referred to as "SL DRX 1") may be implemented for service 1, group 1 or UE pair link 1 with SL DRX offset 1 and SL DRX cycle length 1. A second SL DRX configuration (referred to as "SL DRX 2") may be implemented for service 2, group 2 or UE pair link 2 with SL DRX offset 2 and SL DRX cycle length 2.

The SL DRX cycle 2 may be the same as SL DRX Cycle Length 1, but SL DRX Offset 2 may be different than SL DRX offset 1 to avoid possible overlapping between SL DRX On 2 and SL DRX On 1. A third SL DRX configuration (also referred to as "SL DRX 3") may be implemented for service 3, group 3 or UE pair link 3 with SL DRX offset 3 and SL DRX cycle length 3. In this case, SL DRX cycle length 3 may be longer than SL DRX cycle length 1.

As illustrated, an SL DRX offset generally refers to an offset of an SL DRX cycle from a system reference point in time. The reference point in time may be synchronized between UEs using one or more suitable means, such as via synchronization signaling from a base station (BS) (e.g., gNB or eNB via Uu interface when under network's coverage), a Global Navigation Satellite System (GNSS), or a synchronization reference source UE on sidelink (e.g., SyncRef via PC5 interface when out of network's coverage).

In certain aspects, determining the SL DRX pattern at block 510 may include determining an SL DRX cycle length based on at least a configured cycle length, e.g., a minimum cycle length. Similarly, determining the SL DRX pattern may also include determining an SL DRX offset based on at least a configured SL DRX offset, e.g., a minimum SL DRX offset, as described in more detail herein.

Figure 7A:
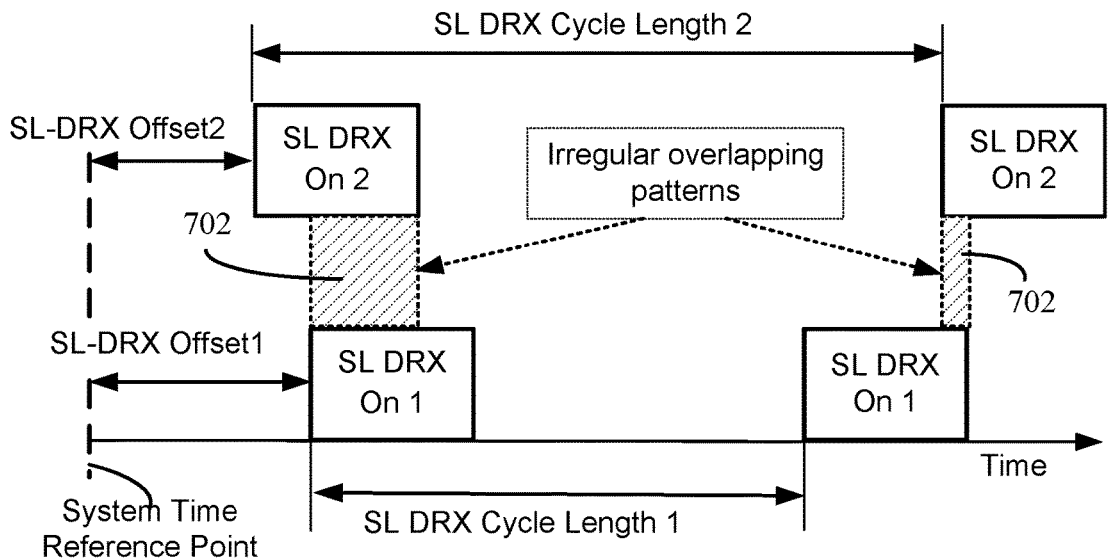
FIGS. 7A and 7B illustrate implementation of an SL DRX cycle length determined as a multiple of a minimum SL DRX cycle length, in accordance with certain aspects of the present disclosure.
Figure 7B:
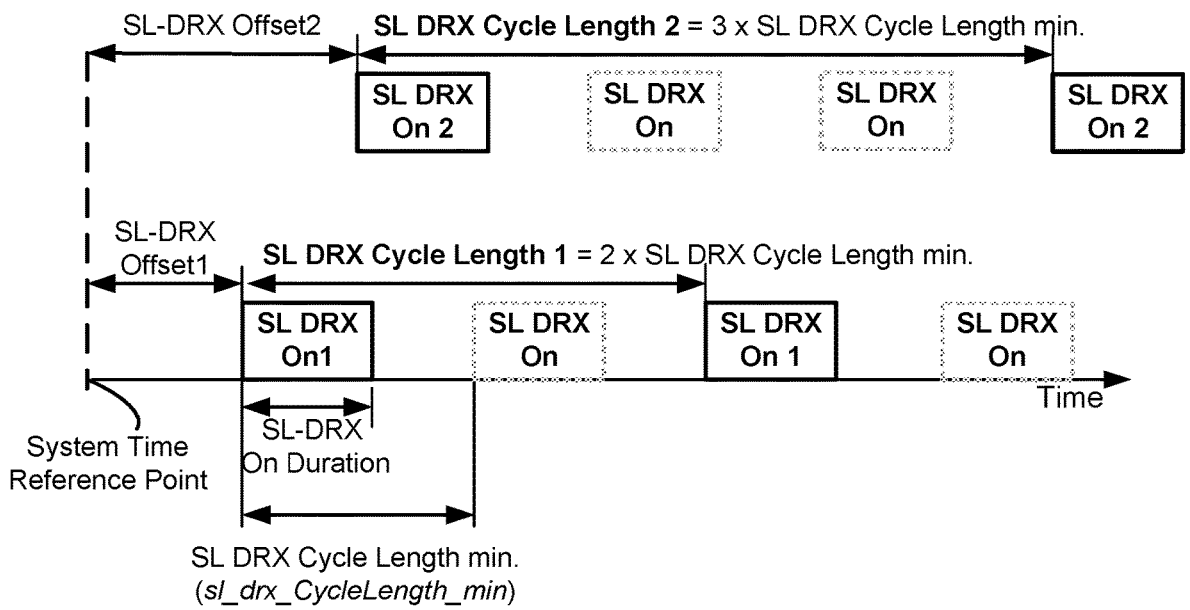

FIGS. 7A and 7B illustrate implementation of an SL DRX cycle length determined as a multiple of a configured SL DRX cycle length (e.g., a minimum SL DRX cycle length) to avoid irregular SL DRX overlapping patterns, in accordance with certain aspects of the present disclosure. As illustrated in FIG. 7A, the SL DRX on phases for different services, groups, or UE pairs may overlap in time region 702. To avoid irregular full or partial overlapping patterns among different services, groups, or UE pairs, as illustrated in FIG. 7A, an SL-DRX cycle length may be configured with one or multiple of a configured SL DRX cycle length (e.g., a minimum SL DRX cycle length indicated by an sl_drx_CycleLength_min parameter as the granularity of SL DRX cycle length) for a service, a group, or a UE pair on sidelink, as illustrated in FIG. 7B. A configured SL DRX cycle length may be defined per QoS parameters, as an example, by a packet delay budget (PDB) or latency requirement supported for a service or service type in the cell for under network coverage or in proximity (e.g., region or zone or zone group) for out of network coverage. For example, different services or service types may have different PC5 QoS requirements or PC5 QoS flows (e.g., different QoS parameters, PC5 QoS profiles, or PC5 5QI (PQI) values) and a UE may be preconfigured (e.g., when out of network coverage) or configured or indicated (e.g., when in network coverage) with different SL DRX cycle lengths associated with different QoS requirements, where the different SL DRX cycle lengths may be one or multiple of a minimum SL DRX cycle length. The minimum SL DRX cycle length may be a common factor (e.g., in slots, subframes or frames, or in milliseconds or seconds) of all the SL DRX cycle lengths associated with all the services or service types or all the QoS profiles or PQI values preconfigured, configured, or indicated (e.g., via system information (SI) or MAC CE). For another example, a service or service type supporting multiple QoS requirements or flows may have multiple SL DRX cycle lengths associated and a UE may determine an SL DRX cycle length with the tradeoff between QoS requirements and power saving (e.g., using the minimum SL DRX cycle length for QoS or the maximum SL DRX cycle length for power saving or an averaged SL DRX cycle length for balancing the QoS and power saving).

As illustrated in FIG. 7B, a first SL configuration (SL DRX 1) may be implemented for service 1, group 1 or UE pair link 1 with SL DRX offset 1 and SL DRX cycle length 1, wherein SL DRX cycle length is twice of the configured SL DRX cycle length, e.g., a minimum cycle length, based on its QoS profile or PQI. Moreover, a second SL configuration (SL DRX 2) may be implemented for service 2, group 2 or UE pair link 2 with SL DRX offset 2 and SL DRX cycle length 2, wherein SL DRX cycle length 2 is three times of the configured SL DRX cycle length, e.g., a minimum cycle length, based on its QoS profile or PQI and its traffic pattern. By selecting the DRX cycle length as a multiple of a configured SL DRX cycle length, e.g., a minimum cycle length, irregular overlapping of SL DRX on phases across services, groups, or UE pairs may be avoided.

In some aspects, the determination of the SL DRX pattern, at block 510, may include determining an SL DRX offset based on randomization. For example, the randomization may be implemented with a random number generated based on a seed which is associated with a service, a group, or a UE pair, for example, associated with the identification (e.g., layer 2 (L2) identifier or index) of the service, the group, or the UE pair. In certain aspects, determining the SL DRX pattern may include determining an SL DRX offset based on even distribution, e.g., a modulo function with one of the identification of the service, the group, or the UE pair, e.g., the L2 identifier or index of the service, the group, or the UE pair.

Figure 8:
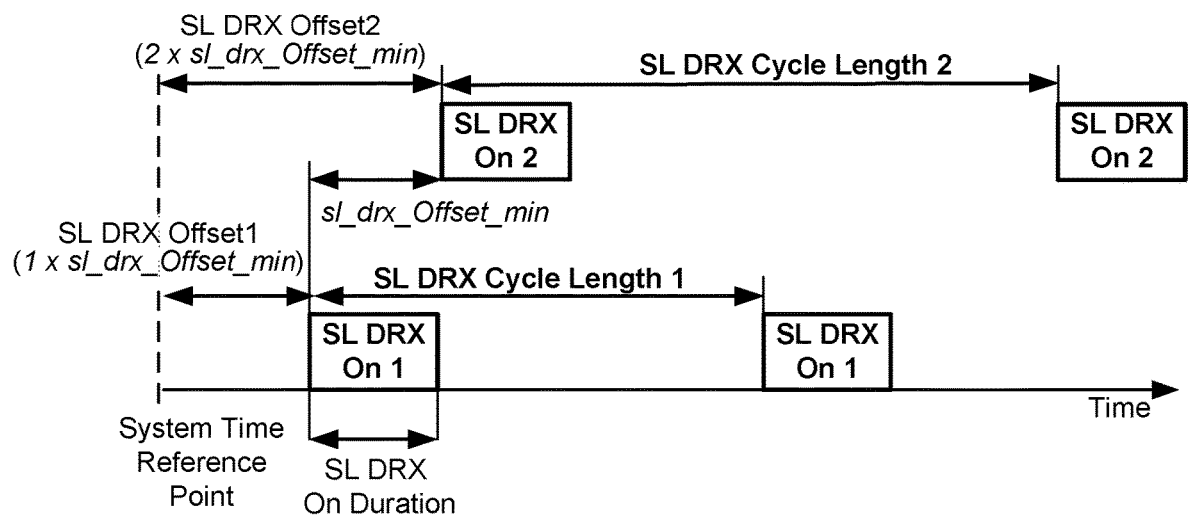
FIG. 8 illustrates configurations of SL DRX offsets for different services, groups, or UE pairs, in accordance with certain aspects of the present disclosure.

FIG. 8 illustrates configurations of SL DRX offsets for different services, groups, or UE pairs, in accordance with certain aspects of the present disclosure. To reduce full or partial overlapping among different services, groups, or UE pairs, an SL DRX offset may be configured with a different value for a service, a group, or a UE pair on sidelink. For instance, an SL DRX offset for service i, group i, or UE pair i may be generated based on a configured SL DRX offset value (e.g., a minimum offset between two adjacent SL DRX Ons), for example, using one or multiple of the configured SL DRX offset (e.g., SL DRX Offset 1 is one of SL DRX Offset min and SL DRX Offset 2 is two of SL DRX Offset min).

For example, the SL DRX offset i (e.g., SL DRX Offset) may be set as the product of a configured SL DRX offset value (e.g., a minimum offset labeled as "sl_drx_offset_min") and a randomly generated integer N, in accordance with expression:

$$SL\_DRX\_Offset_i = sl\_drx\_offset\_min \times N(seed_i)$$

where integer $N \geq 0$ may be randomly generated using a seed i associated with service i, group i or UE pair i. For example, i may be set in accordance with the identification (e.g., based on L2 ID or index) associated with the service, group, or UE pair.

As another example, SL DRX offset i may be set as a product of a configured SL DRX offset value (e.g., a minimum offset) and a modulo function (i mod M), based on expression:

$$SL\_DRX\_Offset_i = sl\_drx\_offset\_min \times (i \bmod M)$$

where the integer $i \geq 0$ is associated with service i, group i, or UE pair i, e.g., based on the L2 ID or index, and integer $M > 0$ is, for example, the maximum number of non-overlapping SL DRXs possible within a time duration for service(s), group(s), or UE pair(s) on sidelink.

In some aspects, the configured SL DRX offset (e.g., SL DRX Offset min in slots or subframes or frames, or in milliseconds or seconds) may be configured, for example, based on a length of SL DRX On duration (e.g., the SL DRX on duration for a service, group or UE pair, or the minimum or maximum SL DRX on duration for different services, groups or UE pairs) based on the amount of overlapping allowed depending on the granularity of setting an SL DRX offset. In other words, for services that may be sensitive to interference, the DRX pattern may be configured in an attempt to have no overlapping of DRX on phases with other services, e.g., with the SL DRX offset of at least the full length of the SL DRX on duration. But for other services, at least a partial overlap may be suitable, for example, if interference is not a concern.

FIG. 9 illustrates example SL-DRX configuration parameters that may be indicated in an RRC IE for a service, a group or a UE, in accordance with certain aspects of the present disclosure. The parameter sl-drx-Offset-min, as an example of a configured SL DRX Offset, may indicate the minimum time offset which may be a minimum starting point of an SL-DRX cycle from a system reference point, e.g., System Frame Number (SFN) or Direct Frame Number (DFN) (e.g., from gNB, eNB or GNSS) or radio frame (e.g., from a SyncRef UE). The parameter sl-drx-Offset-seed may be a random seed of uniform distribution for integer $N \geq 0$ generation. The parameter sl-drx-Offset-i may indicate the integer $i \geq 0$ for service i, group i or UE pair i (e.g., based on the L2 ID or index for the service, group, or UE pair). The parameter sl-drx-Offset-M may be an integer $M > 0$ for the maximum number of possible non-overlapping SL DRXs for a service, group, or UE pair. The parameter sl-drx-CycleLength-min, as an example of a configured SL DRX Cycle, may be the minimum length in time for an SL DRX cycle based on the most stringent QoS requirement (e.g., the least PDB or latency of different QoS profiles or PQIs). The parameter sl-drx-onDurationTimer may be the DRX on duration of the SL DRX based on the service or service type's QoS requirement (e.g., QoS profile or PQI), during which the UE(s) operating on sidelink monitors SCI or Sidelink MAC CE for sidelink communications. The parameter sl-drx-InactivityTimer may indicate the extended duration of active state or on state after the SCI indicating one or more SL transmissions based on the service or service type's QoS requirement (e.g., QoS profile or PQI). The parameter sl-drx-RetransmissionTimer may indicate the maximum duration for an SL retransmission. The parameter sl-drx-HARQ-RTT-Timer may indicate the minimum duration before an SL hybrid automatic repeat request (HARD) retransmission.

Techniques for Further Improving SL DRX Cycle and DRX on Duration for Different QOS and Power Saving Requirements For a Service, a UE Group, or a UE Pair Certain aspects provide techniques for improving an SL DRX with different data transmissions with a service, a group, or a UE pair, facilitating power saving and meeting QoS requirements. For example, certain aspects are directed to a scalable sidelink DRX pattern (e.g., scalable SL DRX cycle length) to facilitate different conditions associated with different messages on SL. For instance, a V2X service, group or UE pair may have different data transmissions with different quality of service (QoS) requirements (e.g., different QoS flows with different packet delay budgets), traffic patterns (e.g., periodic or aperiodic, frequency of packet arrival, size of packet, etc.), and power saving requirements (e.g., V2P for pedestrian UEs, UEs for public safety, etc.). As one example, some message on the SL may have a low latency requirement (e.g., low packet delay budget). Thus, the DRX cycle length may be scaled (e.g., reduced) to facility the low latency requirement of those messages.

Certain aspects are directed to a scalable sidelink DRX (refer to as sSL-DRX) to assist receiving UE(s) in monitoring sidelink control signal(s) for different sidelink communications with different QoS requirements, traffic characteristics, power saving requirements with a service, a group, or a UE pair. For example, certain aspects provide a scalable SL DRX cycle length implemented by skipping different SL-DRX on phases for different conditions such as latency (e.g. packet delay budget), traffic pattern (e.g., periodic or aperiodic), and power saving (e.g., pedestrian UEs). A scalable SL-DRX on phase may also be implemented based on different QoS requirements or traffic patterns using a different starting point and active length within the configured SL DRX On duration for finer control of SCI monitoring, as described in more detail herein. A scalable SL DRX on may also be implemented with one or multiple contiguous finer active intervals (also referred to as "MinOn") within the configured SL DRX On duration for finer control of SCI monitoring.

The configuration of scalable sidelink DRX (sSL-DRX) may be implemented via various configuration parameter, as will be described in more detail herein. The configuration parameters may be indicated or configured via an RRC IE (e.g., via system information or dedicated RRC configuration message), or preconfigured.

Figure 10:
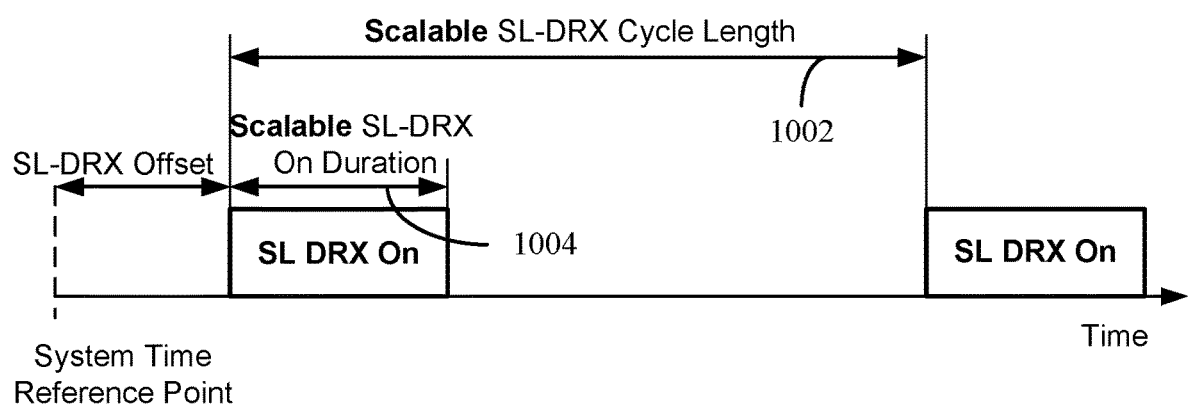
FIG. 10 illustrates a scalable SL DRX cycle length and a scalable SL DRX on duration, in accordance with certain aspects of the present disclosure.

FIG. 10 illustrates a scalable SL DRX cycle length 1002 and a scalable SL DRX on duration 1004, in accordance with certain aspects of the present disclosure. To further improve the DRX cycle and DRX on pattern for different QoS requirements with a service, a group, or a UE pair, a scalable SL DRX with different SL DRX cycle length and different SL DRX on duration may be used to assist receiving UE(s) to monitor sidelink control signal(s) for different sidelink communications with different QoS requirements for a service, a group, or a UE pair (e.g., different SL DRX cycle length and different SL DRX for each QoS flow) or for different sidelink communications from different Tx UEs with a service or a group.

A scalable SL DRX (sSL-DRX) configured for a service, a group, or a UE pair may use different SL-DRX cycle length for different QoS and power saving requirements. For example, an application or service (e.g., a V2X application) may benefit from the ability to communicate long duty cycle small data messages for basic safety. Thus, in such a case, a long SL-DRX cycle length may be desired. A UE may scale a previously configured SL DRX cycle length to facilitate this requirement. However, such an application or service may also provide road obstruction image and maneuver map for advanced driving scenarios. Communication of obstruction image and maneuver map may have to be communicated with a short latency to allow other vehicles to take advantage of such information in a timely manner. In such a case, a short SL DRX cycle length may be desired to facilitate a short latency when communicating the obstruction image and maneuver map. Thus, a UE may scale the configured SL DRX cycle length depending on the QoS requirement (e.g., latency) of the message being transmitted.

In certain aspects, determining the DRX pattern at block 510 may include determining a DRX cycle length that is scalable based on one or more conditions associated with the communication. Determining the DRX cycle length may involve skipping one or more DRX on phases based on the one or more conditions associated with the communication, as described in more detail herein.

As another example, a scalable SL DRX (sSL-DRX) configured for a service, a group, or a UE pair may use different SL-DRX active intervals (e.g., On duration timer or Inactivity timer) for different QoS requirements. For example, a service (e.g., V2X application) may provide multiple messages with different size and delay budget, where an earlier start point in SL DRX On duration is more suitable for small packet delay budget and a longer SL DRX active interval is more suitable for large data messages. For another example, different Tx UEs of a service, a group, or a UE pair may use different active intervals within an SL DRX on duration to avoid transmission collisions and thus allow Rx UE(s) to monitor and detect each transmission at different on intervals from different Tx UEs.

Figure 11:
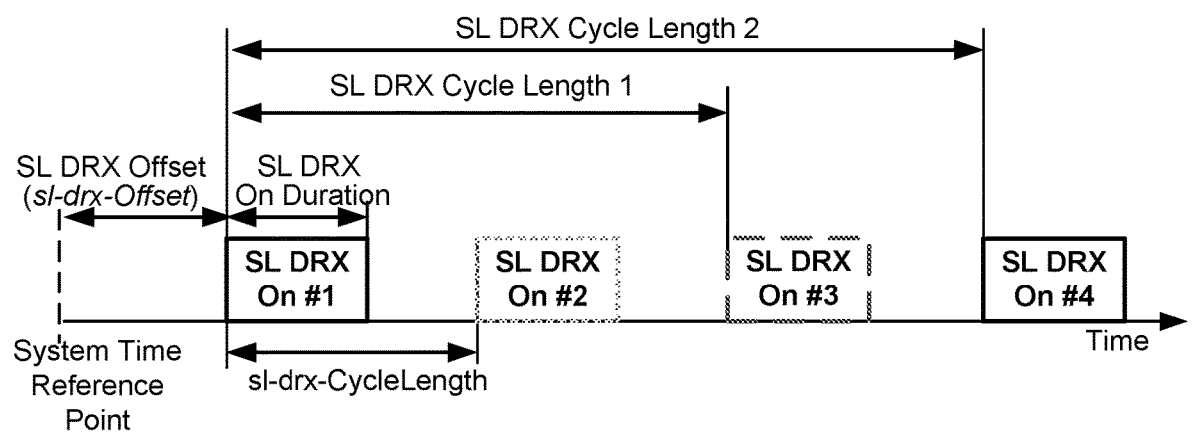
FIG. 11 illustrates a scalable SL DRX cycle length implemented by skipping different SL DRX on phases, in accordance with certain aspects of the present disclosure.

FIG. 11 illustrates a scalable SL DRX cycle length implemented by skipping different SL DRX on phases, in accordance with certain aspects of the present disclosure. For example, a scalable sidelink DRX (sSL-DRX) may be implemented with different active SL DRX cycle lengths for different QoS requirements (e.g., for different QoS flows of a service, a group, or a UE pair). For example, the active SL DRX cycle length may be configured with one or multiple of SL-DRX on phases (e.g., based on a minimum SL DRX cycle length) skipped per packet delay budget or latency requirement, per a traffic pattern, or per power saving requirement within a service, a group, or a UE pair.

As illustrated, an SL DRX Cycle Length 1 may be set where the active SL DRX Cycle Length1 is twice of the sl-drx-CycleLength as the "SL DRX On #2" is skipped (e.g., for a specific traffic pattern). Similarly, SL DRX Cycle Length 2 may be set, where active SL DRX Cycle Length 2 is three times of the sl-drx-CycleLength as both the "SL DRX On #2" and the "SL DRX On #3" are skipped (e.g., to facilitate greater power saving for pedestrian UEs).

In general, SL DRX Cycle Length i may be formed by skipping a number of SL DRX on phases, so that SL DRX Cycle Length i=N×sl-drx-CycleLength with N−1 SL DRX On phases skipped, where N is an integer that is equal to or greater than 1 and is selected based on a QoS requirement for communication of messages such as latency or packet delay budget (e.g., QoS flow i, traffic pattern i, or power saving requirement i with a service, a group, or a UE pair), or based on traffic pattern (e.g., periodicity i), or based on power saving (e.g., frequency i for monitoring the SCI on sidelink).

Figure 12:
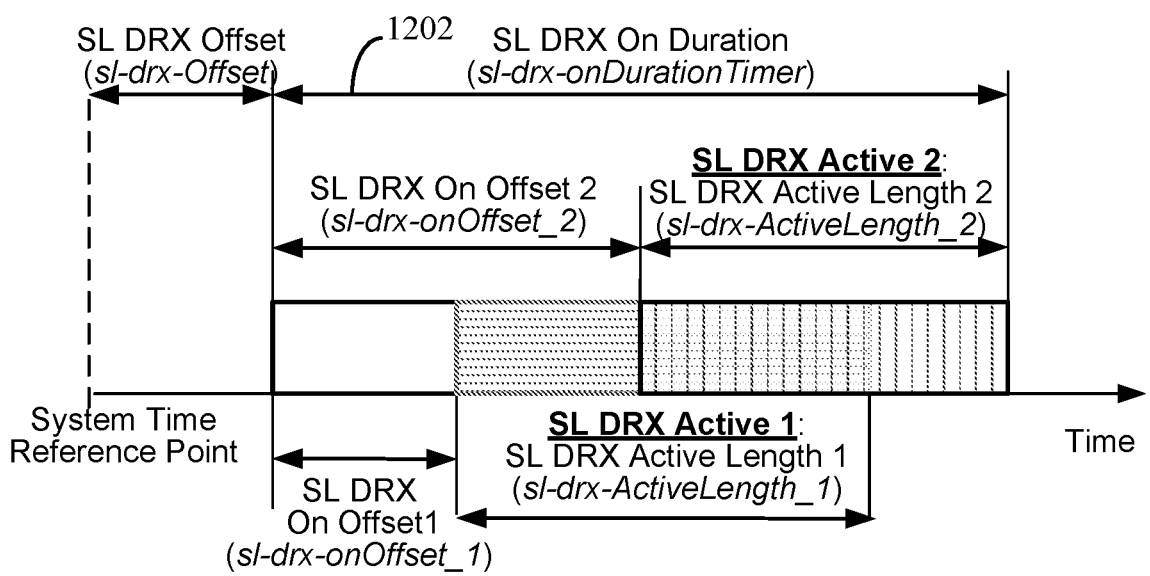
FIG. 12 illustrates a scalable SL DRX with different starting points and on lengths within an on-duration for different quality of service (QoS) requirements, in accordance with certain aspects of the present disclosure.

FIG. 12 illustrates a scalable sidelink SL DRX (sSL-DRX) with different starting points and active lengths within an SL DRX On duration for different QoS requirements (e.g., QoS flows with different requirements for priority, latency, reliability or error rate, data rate or data volume, etc.) from one or multiple Tx UEs, in accordance with certain aspects of the present disclosure. For example, an SL DRX may be configured for a service, a group, or a UE pair with different SL DRX on offsets (e.g., sl-drx-OnOffset) and different SL DRX active length (e.g., sl-drx-ActiveLength) within an SL DRX On duration to form different finer SL DRX active phases for different packet delay budget, and power saving from one or multiple Tx UEs within a service, a group or a UE pair. The overlapping among different finer SL DRX active phases within an SL DRX On duration may be adjusted or avoided with SL DRX on offset and SL DRX active length.

As illustrated, SL DRX Active 1 may be formed with SL DRX on offset 1 (e.g., sl-drx-onOffset_1) and SL DRX Active Length 1 (e.g., sl-drx-ActiveLength_1) within the configured SL-DRX On Duration (e.g., an on duration 1202) for a QoS flow with higher priority or shorter latency or delay budget requirements as an example. In other words, instead of being in an active or awake state during the entirety of the configured on duration 1202, a UE may in an active or awake state for only a portion of the on duration 1202 for more power saving, and the active or awake phase may be set using an offset (e.g., SL DRX On Offset 1) from the beginning of the on duration and a length of the active phase (e.g., SL DRX Active Length 1). Similarly, SL-DRX Active 2 may be formed with SL DRX on offset 2 and SL DRX active length 2 within the SL DRX On Duration (e.g., on duration 1202) for a QoS flow with a lower reliability or priority or with a larger latency or delay budget requirements, as an example. In general, an SL-DRX Active i is formed with SL-DRX on offset i and SL DRX active length i within the SL-DRX On Duration, for QoS flow i with a latency or delay budget requirement, traffic pattern i, or a power saving requirement i.

Figure 13:
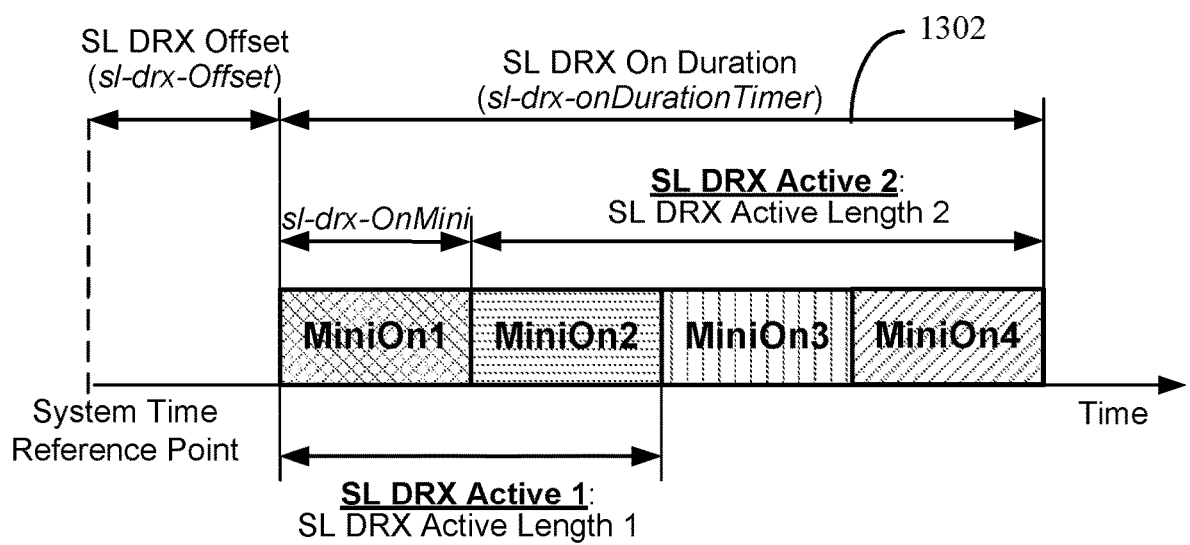
FIG. 13 illustrates a scalable SL DRX on phase with multiple mini-on intervals, in accordance with certain aspects of the present disclosure.

FIG. 13 illustrates a scalable DRX (sSL-DRX) on phase with multiple mini-on intervals, in accordance with certain aspects of the present disclosure. A sSL-DRX may include multiple mini-on intervals during a configured SL DRX On Duration 1302 for different QoS requirements (e.g., QoS flows). For example, an SL DRX (e.g., SL-DRX) may be configured for a service, a group, or a UE pair with multiple mini-on intervals (e.g., sl-drx-OnMini) within the SL DRX On Duration for different delay, traffic pattern, data rate, data volume, priority or reliability, and power saving requirements of a service, a group, or a UE pair.

For example, SL-DRX Active 1 may be formed with MiniOn 1 and MiniOn 2 within the SL DRX On Duration 1302 for a QoS flow with higher priority or reliability or shorter latency or delay budget requirements. As another example, SL DRX Active 2 may be formed with MiniOn 2, MiniOn 3 and MiniOn 4 within the SL DRX On Duration 1302 for QoS flow with lower priority or reliability or larger latency or delay budget requirements. In general, SL DRX Active i may be formed with i contiguous mini-on intervals within an SL DRX On Duration, for QoS flow i with a latency or delay budget requirement i, traffic pattern i, or power saving i.

Figure 14:
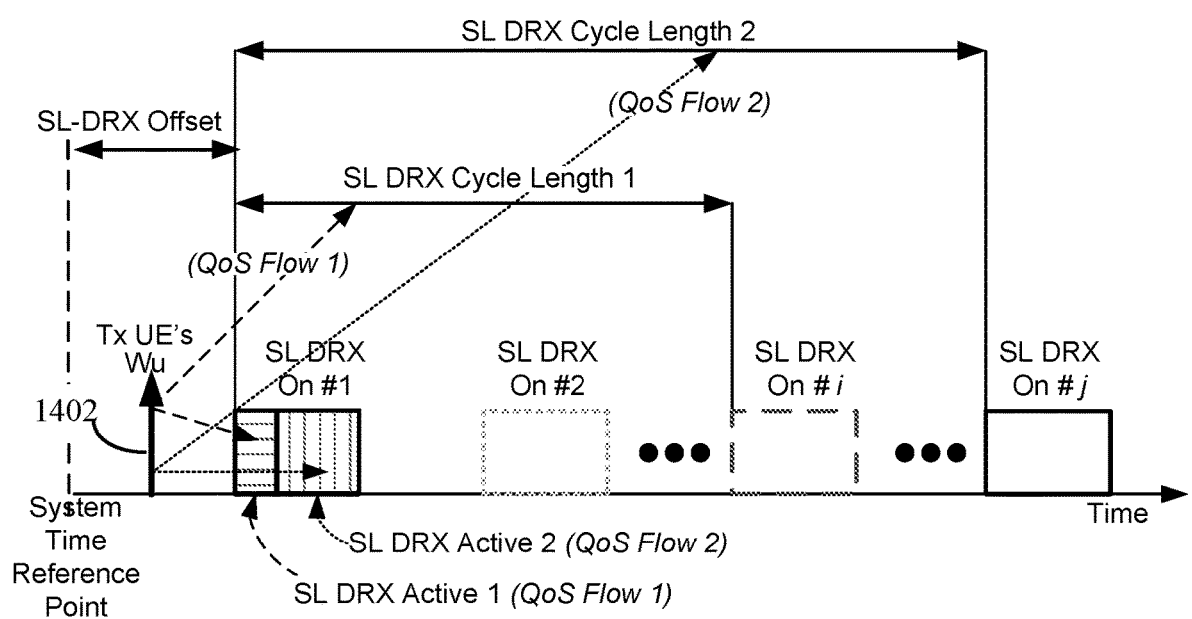
FIG. 14 illustrates two SL DRX cycle lengths indicated by a transmit UE's wake-up (WU) indication, in accordance with certain aspects of the present disclosure.

FIG. 14 illustrates two SL DRX cycle lengths indicated by a TX UE's wake-up (WU) indication, in accordance with certain aspects of the present disclosure. For example, a Tx UE's WU indication 1402 may indicate a scalable SL-DRX. That is, a Tx UE may have two QoS flows (e.g., with different QoS parameters) to support for a V2X application or service (e.g., QoS flow 1 and QoS flow 2). The Tx UE's WU indication 1402 may indicate the SL DRX Cycle Length 1 and SL DRX Active 1 for QoS flow 1 (e.g., indicated with a QoS profile or PQI value, or a QoS parameter such as priority, PDB, Packet Error Rate, Maximum Data Burst Volume, PC5 Flow Bit Rates, PC5 Link Aggregated Bit Rates, or Range), for example, with packet delay budget 1 and SL DRX Cycle Length 2 and SL DRX Active 2 for QoS flow 2 (e.g., indicated with another QoS profile or PQI value or QoS parameter), for example, with packet delay budget 2. For another example, a Tx UE's WU indication 1402 may also indicate a scalable SL-DRX for different traffic patterns, or for different UE power saving requirements.

FIG. 15 illustrates example scalable SL DRX configuration parameters that may be indicated in an RRC IE for a service, a group or a UE, in accordance with certain aspects of the present disclosure. The parameter sl-drx-Offset may indicate a time offset (e.g., starting point in slots, subframes or frames, or in milliseconds or seconds) of an SL DRX cycle from a system reference point such as a System Frame Number (SFN) or Direct Frame Number (DFN) or radio frame. The parameter sl-drx-CycleLength may indicate the length in time (e.g., in milliseconds or seconds) or in system time units (e.g., slots, subframes or frames) of the SL DRX cycle. The parameter sl-drx-onSkip may indicate the bitmap of the SL DRX on skipping (e.g., within a string of "0" or "1" bits corresponding SL DRX Ons during a certain time interval or a certain window which may be based on the maximum SL DRX cycle length to support, a "0" bit value may indicate that the corresponding SL DRX On is skipped). The parameter sl-drx-onDurationTimer may indicate the on duration of the SL DRX (e.g., based on a service or service type's maximum QoS requirement such as the highest maximum flow bit rate (MFBR) or per link aggregate maximum bit Rate (PC5 LINK-AMBR) or maximum data burst volume of multiple QoS flows) or reliability, during which the UE(s) operating on sidelink monitors Sidelink Control Signal (SCI) or Sidelink MAC CE for sidelink communications. The parameter sl-drx-onOffset may indicate the starting point within the on duration of the SL DRX. The parameter sl-drx-ActiveLength may indicate the length within the on duration of the SL DRX. The parameter sl-drx-onMini may indicate the size of Mini-On within the on duration of the SL DRX. The parameter sl-drx-InactivityTimer may indicate the extended active duration after an SCI indicating one or more SL transmission(s). The parameter sl-drx-Retransmission Timer may indicate the maximum duration for an SL retransmission. The parameter sl-drx-HARQ-RTT-Timer may indicate the minimum duration before an SL HARQ retransmission.

Figure 16:
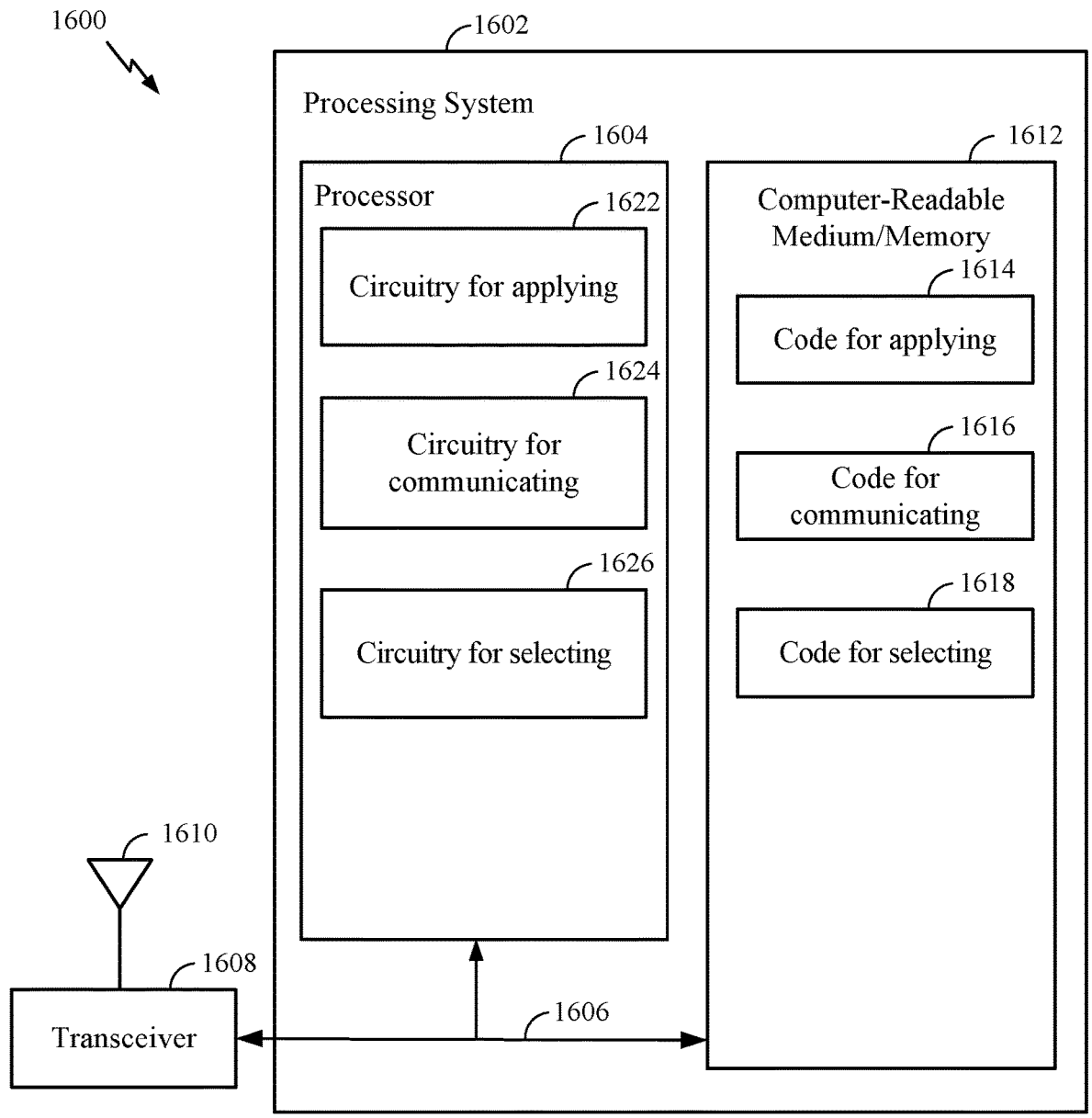
FIG. 16 illustrates a communications device that may include various components configured to perform operations for the techniques disclosed herein.

FIG. 16 illustrates a communications device 1600 that may include various components (e.g., corresponding to means-plus-function components) configured to perform operations for the techniques disclosed herein, such as the operations illustrated in FIG. 5. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 5. In certain aspects, computer-readable medium/memory 1612 stores code 1614 for determining; code 1616 for communicating (e.g., receiving, or transmitting), and code 1618 for selecting. In certain aspects, the processor 1604 has circuitry configured to implement the code stored in the computer-readable medium/memory 1612. The processor 1604 includes circuitry 1622 for determining; circuitry 1624 for communicating (e.g., receiving, or transmitting); and circuitry 1626 for selecting.

EXAMPLE CLAUSES

Implementation examples are described in the following numbered clauses:

Clause 1. A method for wireless communication by a user-equipment (UE), comprising: receiving one or more configurations for sidelink discontinuous reception (DRX); determining a sidelink DRX pattern associated with a communication based on the one or more configurations for sidelink DRX, the communication comprising a communication among UEs using a service via broadcast, a communication among UEs of a group via groupcast, or a communication between a UE pair via unicast; and communicating with one or more other UEs on sidelink using the determined DRX pattern.

Clause 2. The method of clause 1, wherein determining the sidelink DRX pattern on sidelink comprises selecting a sidelink DRX cycle length from different candidate sidelink DRX cycle lengths configured for different services, groups of UEs, or UE pairs.

Clause 3. The method of clause 2, wherein the different candidate sidelink DRX cycle lengths configured are associated with different quality of service (QoS) requirements.

Clause 4. The method of any one of clauses 1-3, wherein determining the DRX pattern on sidelink comprises determining a sidelink DRX offset for the service, the group, or the UE pair, wherein the sidelink DRX offset indicates an offset of a sidelink DRX on phase from a reference point in time.

Clause 5. The method of clause 4, wherein the service, the group, or the UE pair is further identified with an ID or index.

Clause 6. The method of any one of clauses 1-5, wherein determining the sidelink DRX pattern comprises determining a sidelink DRX cycle length based on at least a configured cycle length.

Clause 7. The method of any one of clauses 1-6, wherein determining the sidelink DRX pattern further comprises determining a sidelink DRX offset based on at least a configured sidelink DRX offset from a reference point in time.

Clause 8. The method of any one of clauses 1-7, wherein determining the sidelink DRX pattern further comprises determining a DRX offset based on a random number.

Clause 9. The method of clause 8, wherein the random number is based on a seed which is associated with an identification of the service, the group, or the UE pair.

Clause 10. The method of any one of clauses 1-9, wherein determining the sidelink DRX pattern further comprises determining a sidelink DRX offset based on a modulo function using an identification of the service, the group, or the UE pair.

Clause 11. The method of any one of clauses 1-10, wherein determining the sidelink DRX pattern further comprises determining a sidelink DRX cycle length that is scalable based on one or more conditions associated with a communication.

Clause 12. The method of clause 11, wherein determining the sidelink DRX cycle length comprises skipping one or more DRX on phases based on the one or more conditions associated with the communication.

Clause 13. The method of any one of clauses 1-12, wherein determining the sidelink DRX pattern further comprises determining an active duration within a sidelink DRX on phase of the sidelink DRX pattern, the sidelink DRX on phase being scalable based on one or more conditions associated with the communication.

Clause 14. The method of clause 13, wherein determining the duration of the sidelink DRX on phase comprises selecting one or more contiguous active intervals based on the one or more conditions associated with the communication.

Clause 15. The method of any one of clauses 1-14, wherein determining the sidelink DRX pattern comprises determining a starting point of an active duration within a sidelink DRX on phase of a sidelink DRX cycle based on one or more conditions associated with the communication.

Clause 16. The method of clause 15, wherein the one or more conditions comprise a QoS associated with the communication, a traffic characteristics during the communication, or a power saving requirement of the UE.

Clause 17. The method of any one of clauses 1-16, further comprising transmitting a wake-up (WU) indication indicating a sidelink DRX pattern for one or more data packets associated with a QoS requirement, the determination of the sidelink DRX pattern being based on the WU indication.

Clause 18. The method of any one of clauses 1-17, further comprising receiving a wake-up (WU) indication indicating a sidelink DRX pattern for one or more data packets associated with a QoS requirement, the determination of the sidelink DRX pattern being based on the WU indication.

Clause 19. The method of clause 18, wherein the sidelink DRX pattern comprises at least one of a sidelink DRX cycle length or a sidelink DRX on phase duration.

Clause 20. The method of any one of clauses 18-19, wherein the QoS requirement comprises a latency requirement.

Clause 21. The method of any one of clauses 18-20, wherein the QoS requirement comprises a reliability requirement.

Clause 22: An apparatus, comprising: a memory comprising executable instructions; one or more processors configured to execute the executable instructions and cause the apparatus to perform a method in accordance with any one of Clauses 1-21.

Clause 23: An apparatus, comprising means for performing a method in accordance with any one of Clauses 1-21.

Clause 24: A non-transitory computer-readable medium comprising executable instructions that, when executed by one or more processors of an apparatus, cause the apparatus to perform a method in accordance with any one of Clauses 1-21.

Clause 25: A computer program product embodied on a computer-readable storage medium comprising code for performing a method in accordance with any one of Clauses 1-21.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   receiving a configuration indicating a sidelink discontinuous reception (DRX) on duration;
   selecting a sidelink discontinuous reception (DRX) pattern associated with a communication based on the configuration, wherein the sidelink DRX pattern includes a sidelink DRX active state within the sidelink DRX on duration, wherein the sidelink DRX pattern further includes a sidelink DRX on offset starting from a beginning of the sidelink DRX on duration to a beginning of the sidelink DRX active state; and
   communicating with one or more other UEs via one or more sidelink channels using the sidelink DRX pattern.

2. The method of claim 1, wherein selecting the sidelink DRX pattern comprises selecting a sidelink DRX cycle length from different candidate sidelink DRX cycle lengths configured for different services, groups of UEs, or UE pairs.

3. The method of claim 2, wherein the different candidate sidelink DRX cycle lengths configured are associated with different QoS requirements.

4. The method of claim 1, wherein selecting the sidelink DRX pattern comprises selecting a sidelink DRX offset for a service for communication via broadcast, a group of UEs for communication via groupcast, or a UE pair for communication via unicast, wherein the sidelink DRX offset indicates an offset of a sidelink DRX on phase from a reference point in time.

5. The method of claim 1, wherein selecting the sidelink DRX pattern comprises determining a sidelink DRX cycle length based on at least a configured cycle length.

6. The method of claim 1, wherein selecting the sidelink DRX pattern further comprises selecting a sidelink DRX offset based on at least a configured sidelink DRX offset from a reference point in time.

7. The method of claim 1, wherein selecting the sidelink DRX pattern further comprises determining a DRX offset based on a random number.

8. The method of claim 7, wherein the random number is based on a seed which is associated with an identification of a service for communication via broadcast, a group of UEs for communication via groupcast, or a UE pair for communication via unicast.

9. The method of claim 1, wherein selecting the sidelink DRX pattern further comprises selecting a sidelink DRX offset based on a modulo function using an identification of a service for communication via broadcast, a group of UEs for communication via groupcast, or a UE pair for communication via unicast.

10. The method of claim 1, wherein selecting the sidelink DRX pattern further comprises selecting a sidelink DRX cycle length that is scalable based on one or more conditions associated with the communication.

11. The method of claim 10, wherein selecting the sidelink DRX cycle length comprises skipping one or more DRX on phases based on the one or more conditions associated with the communication.

12. The method of claim 1, wherein selecting the sidelink DRX pattern comprises selecting a starting point of the sidelink DRX active state within the sidelink DRX on duration based on one or more conditions associated with the communication.

13. The method of claim 12, wherein the one or more conditions comprise a QoS associated with the communication, a traffic characteristic during the communication, or a power saving requirement of the UE.

14. The method of claim 1, wherein the UE is configured as a transmit UE, and wherein the method further comprises transmitting a wake-up (WU) indication indicating whether a receive UE should wake up for reception during at least a portion of a sidelink DRX cycle.

15. The method of claim 1, wherein the UE is configured as a receive UE, and wherein the method further comprises receiving, from a transmit UE, a wake-up (WU) indication indicating whether the receive UE should wake up for reception during at least a portion of a sidelink DRX cycle.

16. The method of claim 1, wherein the sidelink DRX pattern comprises a sidelink DRX cycle length.

17. The method of claim 1, wherein the communication includes groupcast communication.

18. The method of claim 1, wherein the sidelink DRX active state is selected based on one or more quality of service (QOS) requirements.

19. The method of claim 18, wherein one of the one or more QoS requirements comprises a latency requirement.

20. The method of claim 18, wherein one of the one or more QoS requirements comprises a reliability requirement.

21. A user equipment (UE), comprising:
    a processing system that includes one or more processors and one or more memories coupled with the one or more processors, the processing system configured to cause the UE to:
    receive a configuration indicating a sidelink discontinuous reception (DRX) on duration;

select a sidelink DRX pattern associated with a communication based on the configuration, wherein the sidelink DRX pattern includes a sidelink DRX active state within the sidelink DRX on duration, wherein the sidelink DRX pattern further includes a sidelink DRX on offset starting from a beginning of the sidelink DRX on duration to a beginning of the sidelink DRX active state; and communicate with one or more other UEs via one or more sidelink channels using the sidelink DRX pattern.

22. The UE of claim 21, wherein selecting the sidelink DRX pattern includes selecting a sidelink DRX cycle length from different candidate sidelink DRX cycle lengths configured for different services, groups of UEs, or UE pairs.

23. The UE of claim 22, wherein the different candidate sidelink DRX cycle lengths configured are associated with different QoS requirements.

24. The UE of claim 21, selecting the sidelink DRX pattern includes selecting a sidelink DRX offset for a service for communication via broadcast, a group of UEs for communication via groupcast, or a UE pair for communication via unicast, wherein the sidelink DRX offset indicates an offset of a sidelink DRX on phase from a reference point in time.

25. The UE of claim 24, wherein the service, the group, or the UE pair is further identified with an ID or index.

26. The UE of claim 21, wherein selecting the sidelink DRX pattern includes determining a sidelink DRX cycle length based on at least a configured cycle length.

27. The UE of claim 21, wherein selecting the sidelink DRX pattern includes determining a sidelink DRX offset based on at least a configured sidelink DRX offset from a reference point in time.

28. A method of wireless communication performed by a user equipment (UE), comprising:

selecting a sidelink discontinuous reception (DRX) pattern associated with a communication, wherein the communication includes a plurality of sidelink DRX cycle lengths associated respectively with a plurality of quality of service (QOS) requirements;

selecting a sidelink DRX cycle length based on a packet delay budget (PDB) or latency-related QoS requirement, wherein the sidelink DRX cycle length is a minimum sidelink DRX cycle length of the plurality of sidelink DRX cycle lengths; and communicating with one or more other UEs via one or more sidelink channels using the sidelink DRX pattern.

29. A user equipment (UE), comprising:

a processing system that includes one or more processors and one or more memories coupled with the one or more processors, the processing system configured to cause the UE to:

select a sidelink discontinuous reception (DRX) pattern associated with a communication, wherein the communication includes a plurality of sidelink DRX cycle lengths associated respectively with a plurality of quality of service (QOS) requirements;

select a sidelink DRX cycle length based on a packet delay budget (PDB) or latency-related QoS requirement, wherein the sidelink DRX cycle length is a minimum sidelink DRX cycle length of the plurality of sidelink DRX cycle lengths; and communicate with one or more other UEs via one or more sidelink channels using the sidelink DRX pattern.

* * * * *